US012346865B2

(12) United States Patent
Farris et al.

(10) Patent No.: US 12,346,865 B2
(45) Date of Patent: Jul. 1, 2025

(54) SYSTEM AND METHOD FOR CONTROLLING DRONE DELIVERY OR PICK UP DURING A DELIVERY OR PICK UP PHASE OF DRONE OPERATION

(71) Applicants: Emmett Farris, Jacksonville, FL (US); William F. McGee, II, Saint Johns, FL (US)

(72) Inventors: Emmett Farris, Jacksonville, FL (US); William F. McGee, II, Saint Johns, FL (US)

(*) Notice: Subject to any disclaimer, the term of this patent is extended or adjusted under 35 U.S.C. 154(b) by 0 days.

(21) Appl. No.: 18/542,895

(22) Filed: Dec. 18, 2023

(65) Prior Publication Data

US 2024/0119397 A1 Apr. 11, 2024

Related U.S. Application Data

(63) Continuation of application No. 16/987,041, filed on Aug. 6, 2020, now Pat. No. 11,854,108, which is a
(Continued)

(51) Int. Cl.
*G05D 1/00* (2024.01)
*A47G 29/122* (2006.01)
(Continued)

(52) U.S. Cl.
CPC ........... *G06Q 10/08* (2013.01); *A47G 29/122* (2013.01); *A47G 29/141* (2013.01); *A47G 29/30* (2013.01); *B64U 10/13* (2023.01); *B64U 70/90* (2023.01); *G01C 21/20* (2013.01); *G05D 1/0676* (2013.01); *A47G 2029/146* (2013.01); *A47G 2029/149* (2013.01); *B64U 2101/66* (2023.01); *B64U 2201/10* (2023.01)

(58) Field of Classification Search
CPC ............ A47G 29/141; B64C 2201/128; B64C 2201/141; G01C 21/20; G05D 1/0676; G06Q 50/28
See application file for complete search history.

(56) References Cited

U.S. PATENT DOCUMENTS 4,152,703 A 5/1979 Ziemke et al.
6,323,782 B1 * 11/2001 Stephens ............ G07C 9/00571
340/5.73
(Continued)

FOREIGN PATENT DOCUMENTS

CN 103274226 A 9/2013
CN 103778523 A 5/2014
(Continued)

OTHER PUBLICATIONS

U.S. Appl. No. 16/987,041, filed Aug. 6, 2020.
(Continued)

*Primary Examiner* — Anshul Sood
(74) *Attorney, Agent, or Firm* — BakerHostetler

(57) ABSTRACT

A system including a landing location where a drone at least one of delivers and acquires a parcel, and a homing device to interact with the drone to guide the drone to the landing location independent of interaction from another source. The homing device guides the drone during the landing phase of a flight plan. A method is also disclosed.

16 Claims, 9 Drawing Sheets

Related U.S. Application Data continuation of application No. 16/195,500, filed on Nov. 19, 2018, now abandoned, which is a continuation of application No. 14/814,501, filed on Jul. 30, 2015, now Pat. No. 10,163,177.

(60) Provisional application No. 62/031,479, filed on Jul. 31, 2014.

(51) Int. Cl.

| | | |
|---|---|---|
| *A47G 29/14* | (2006.01) | |
| *A47G 29/30* | (2006.01) | |
| *B64U 10/13* | (2023.01) | |
| *B64U 70/90* | (2023.01) | |
| *B64U 101/66* | (2023.01) | |
| *G01C 21/20* | (2006.01) | |
| *G06Q 10/08* | (2024.01) | |

(56) References Cited

U.S. PATENT DOCUMENTS

| | | | | |
|---|---|---|---|---|
| 7,158,941 | B1* | 1/2007 | Thompson | G06Q 10/08 |
| | | | | 340/568.1 |
| 8,983,682 | B1 | 3/2015 | Peeters et al. | |
| 10,124,912 | B2* | 11/2018 | Walsh | B64F 1/32 |
| 2010/0004798 | A1 | 1/2010 | Bodin et al. | |
| 2010/0198514 | A1 | 8/2010 | Miralles | |
| 2011/0017863 | A1 | 1/2011 | Goossen et al. | |
| 2013/0240673 | A1 | 9/2013 | Schlosser et al. | |
| 2014/0022051 | A1 | 1/2014 | Levien et al. | |
| 2014/0032034 | A1* | 1/2014 | Raptopoulos | G05D 1/0088 |
| | | | | 701/25 |
| 2015/0120094 | A1* | 4/2015 | Kimchi | G05D 1/00 |
| | | | | 701/3 |
| 2015/0158599 | A1* | 6/2015 | Sisko | B64F 1/20 |
| | | | | 244/114 R |
| 2015/0175276 | A1* | 6/2015 | Koster | A47G 29/14 |
| | | | | 244/114 R |
| 2015/0248640 | A1* | 9/2015 | Srinivasan | G05D 1/0676 |
| | | | | 705/338 |
| 2016/0284149 | A1* | 9/2016 | Espig | G07C 9/00182 |

FOREIGN PATENT DOCUMENTS

| | | |
|---|---|---|
| CN | 103914076 A | 7/2014 |
| CN | 103955227 A | 7/2014 |
| WO | 2013163746 A1 | 11/2013 |
| WO | 2014080390 A2 | 5/2014 |

OTHER PUBLICATIONS

U.S. Appl. No. 16/195,500, filed Nov. 19, 2018.
U.S. Appl. No. 14/814,501, filed Jul. 30, 2015.
Extended European Search Report from European Application No. 15826856.5 dated Dec. 13, 2017, pp. 1-7.
Deng-Yang, et al., "Study and Design of Automated Drone Express Systems", Computer CD Software and Applications, dated Jun. 15, 2014, pp. 1-26 (English language translation of the figures is provided).
Notification of First Office Action and Search Report from Chinese Application No. 201580045887.9 dated Jan. 29, 2019; 12 pages.

* cited by examiner

SYSTEM AND METHOD FOR CONTROLLING DRONE DELIVERY OR PICK UP DURING A DELIVERY OR PICK UP PHASE OF DRONE OPERATION

CROSS REFERENCE TO RELATED APPLICATIONS

This application is a continuation of U.S. application Ser. No. 16/987,041 filed Aug. 6, 2020, which is a continuation of Ser. No. 16/195,500 filed Nov. 19, 2018, which is a continuation of U.S. application Ser. No. 14/814,501 filed Jul. 30, 2015, which issued as U.S. Pat. No. 10,163,177 on Dec. 25, 2018, which claims the benefit of U.S. Provisional No. 62/031,479 filed Jul. 31, 2014, and incorporated herein by reference in their entirety.

BACKGROUND

Embodiments relate to a drone delivery system and, more particularly, to autonomous control of a drone when performing delivery and/or pick-up of a parcel at designated location.

Recently, the concept of delivery drones and other remote controlled flying delivery devices has emerged. For optimal implementation of such devices, there is a need to communicate to them a specific location at which to deliver and/or pick-up a parcel or other object. Additionally, there is a need to ensure the security of a parcel that has been delivered or is awaiting pick-up. There are a plethora of related devices, some of which contain various aspects that may be applicable in satisfying portions of these needs, but yet leave some crucial elements to be desired.

One such applicable device is described in U.S. Pat. No. 4,152,703. It describes a homing system for vehicles that can return the vehicles to a homing station on demand. The system operates using transmitting antennae communicating with receivers.

Another applicable device is found in U.S. Pat. No. 6,323,782, which describes an unattended delivery system consisting of an enclosure that has a locking mechanism and a transponder. The transponder is configured to communicate with transponders on various items. The transponder on the enclosure has the ability to allow the enclosure to unlock and receive an item that has an approved transponder attached thereto.

Still another applicable device is found in U.S. Pat. No. 7,158,941 which discloses a method for delivering and shipping parcels using a secure receptacle. The secure receptacle contains an access device that controls a lock thereon along with the ability to receive identification codes used to permit the unlocking of the receptacle. The receptacle further contains a scanner that reads labels on parcels that are deposited into it and sends the information to a carrier or central processing station in order to track parcels and manage payment transactions.

The above disclosed devices provide significant utility for their designated purposes. However, they are not currently optimized for use with unmanned aerial vehicles or other drones when about to land to deliver or pick up a parcel.

More specifically, currently, and in a general sense, drone delivery is envisioned as having a customer order an available product, designates the destination location, select the time frame and pays for the product. The order is put in the queue, item is picked, packed, and secured to the drone. The flight plan is loaded. The drone flies between 400 and 1,000 feet at 100 mph or less using flight corridors (three-dimensional aerial freeways) as required. Nearing the destination, the drone exits the corridor and flies to the GPS location at approximately a 400 foot altitude. The drone with package descends like an elevator and the package is released on or near the ground.

Concerns arise with respect to accidents occurring during a drone's flight. More specifically, concerns exist should communication with the drone be lost and how to avoid collisions. Furthermore, just as airplane accidents are more frequent during takeoff and landing, the same may be true with drone flights, especially if the drone is controlled remotely by a user.

Given the foregoing, a need exists for a system or method which facilitates the use of a drone delivery system such that deliveries and pick-ups of parcels can be made securely and accurately without human involvement.

SUMMARY

This Summary is provided to introduce a selection of concepts. These concepts are further described below in the Detailed Description section. This Summary is not intended to identify key features, or essential features, of the embodiments disclosed herein, nor is this Summary intended as an aid in determining the scope of the embodiments.

Embodiments relate to a system, a method and computer software to facilitate the accurate and secure delivery and pick-up of parcels by drones at specific locations without human interaction. The system comprises a landing location where a drone at least one of delivers and acquires a parcel, and a homing device to interact with the drone to guide the drone to the landing location independent of interaction from another source. The homing device guides the drone during the landing phase of a flight plan.

Another system comprises a homing device to interact with a delivery beacon to guide the delivery beacon to a location to at least one of deliver and pick up a parcel, through interaction between the delivery beacon and the homing device and independent of interaction with another source.

The method comprises detecting a drone when the drone is within a distance of a landing location with a homing device when the drone is about to transition to a landing phase of its flight plan. The method also comprises determining whether the drone is authorized to land at the landing location with the homing device. If the drone is authorized to land at the landing location, the method also comprises guiding the drone to the landing location with the homing device independent of interaction with another source.

Another system comprises a homing device to interact with a drone to guide the drone to a landing location through interaction between the drone and the homing device that is independent of interaction with another source.

BRIEF DESCRIPTION OF TUE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
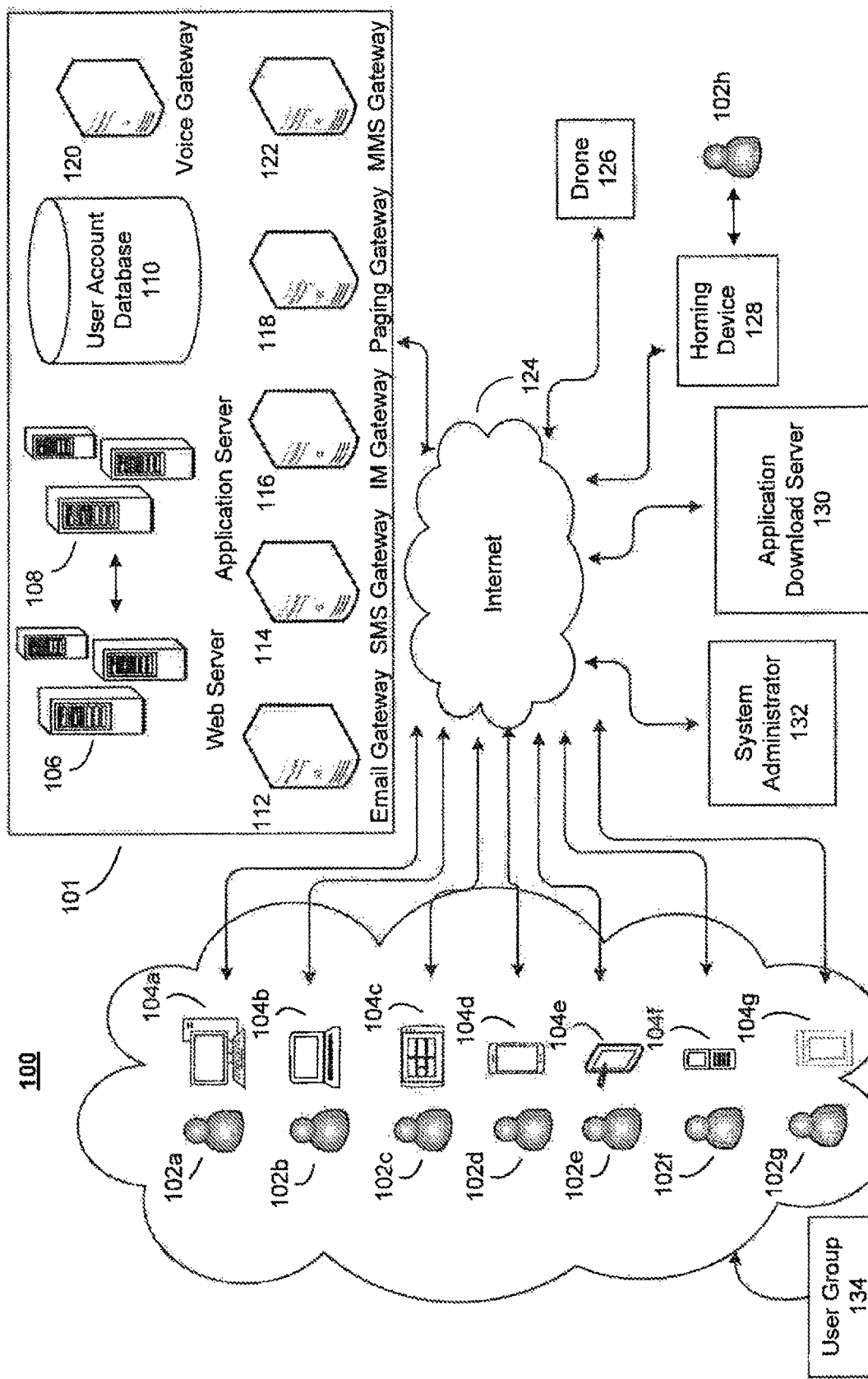
FIG. 1 is a block diagram of an exemplary system for facilitating the use of a drone delivery system with a homing device, according to an aspect of the present disclosure.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

As will be described in further detail herein, embodiments are directed to a system, a method and a computer program product to facilitate the delivery or pick-up of a parcel at a specific location via a drone utilizing an autonomous homing device near a landing location to direct the drone to the landing location. The embodiments facilitate the utilization of the homing device to direct a delivery drone where to deliver and/or pick-up a parcel. Such a configuration allows for a completely automated system with no human involvement or remote control when the drone has reached a given location and is about to begin descend to either to deliver or pick up a parcel or package. This thereby increases the efficiency of parcel delivery in that machines are not subject to the same work output limits as human or when control from a remote facility is required. Thus, a high level of work output can be achieved constantly over an indefinite period of time.

The term "user" and/or the plural form of this term are used throughout herein to refer to senders and receivers of parcels, owners of an embodiment disclosed herein, such as individuals, companies, organizations, and the like. As a non-limiting example, a user may be a person, Amazon.com, or a religious group. The term "parcel" and/or the plural form of this term are used throughout herein to refer to any item that may be transported from a sender to a receiver via a drone, such as boxes, crates, and the like. The term "drone" and/or the plural form of this term are used throughout herein to refer to any unmanned aerial vehicles ("U/kV") or unmanned aerial system ("UAS"), whether controlled remotely or self-piloted. Furthermore, this term may be applicable to an unmanned ground or water vehicle, whether controlled remotely or self-piloted. The term "homing device" and/or the plural form of this term are used throughout herein to refer to any mechanism that guides one moving object to a second object, the second object being either stationary or in motion.

Though the embodiments disclosed herein are discussed with respect to aerial drone delivery, the embodiments disclosed herein are also applicable to water based and ground based drone delivery. Furthermore, the parcel security box disclosed herein is not limited to just drone delivery as the embodiments disclosed may be used with other delivery systems and approaches, such as, but not limited to human delivery.

Referring now to FIG. 1, a block diagram of an exemplary system for facilitating the use of a drone delivery system with a homing device, according to an aspect of the present disclosure, is shown. A cloud-based, Internet-enabled device communication system 100 includes a plurality of users 102 (shown as users 102*a-g* in FIG. 1) accessing—via a user computing device 104 (shown as respective computing devices 104*a-g* in FIG. 1) and a network 124, such as the global, public Internet—an application service provider's cloud-based, Internet-enabled infrastructure 101. A user application may be downloaded onto the user computing device 104 from an application download server 130. The application download server 130 may be a public application store service or a private download service or link. The user computing device 104 may access the application download server 130 via network 124. In another non-limiting embodiment, the infrastructure 101 may be accessed via a website or web application. Multiple users 102 may, simultaneously or at different times, access (via, for example, a user application) the infrastructure 101 in order to engage in communication with a homing device 128 or to access a user account database 110.

In an embodiment, the user 102*h* may communicate directly with a homing device 128 via a touch screen, keypad, or other input means as recognized by those skilled in the relevant art(s) after reading the description herein.

In another embodiment, the computing device 104 may be configured as a desktop computer 104*a*, a laptop computer 104*b*, a tablet or mobile computer 104*c*, a smartphone (alternatively referred to as a mobile device) 104*d*, a Personal Digital Assistant (PDA) 104*e*, a mobile phone 104*f*, a handheld scanner 104g, any commercially-available intelligent communications device, or the like.

An application service provider's cloud-based, communications infrastructure 101 may include one or more web servers 106, one or more application servers 108, user account database 110, an email gateway 112, an SMS gateway 114, an Instant Message (IM) gateway 116, a paging gateway 118, a voice gateway 120, and an MMS gateway 122. The application servers 108 may contain computational instructions, or code, that enables the functionality of system 100. The user account database 110 may not necessarily be contained within the infrastructure 101, such as, but not limited to, the database 110 may be supplied by a third-party.

The user account database 110 may contain account information for each user 102 within the user group 134 of the system 100, including, but not limited to, log in credentials, user location information, user transaction history, type of computing device used, payment and billing information, sensor data, camera images/video, and the like.

A drone 126 may access the infrastructure 101 via the Internet 124 for the purpose of communicating electronically with the homing device 128. In turn, the homing device 128 may access the infrastructure 101 via the Internet 124 for the purpose of communicating electronically with the user computing devices 104 and/or the drone 126. As discussed further herein, the drone 126 and the homing device 128 may' communicate directly, independent of any other elements disclosed herein.

A system administrator 132 may access the infrastructure 101 via the Internet 124 in order to oversee and manage the infrastructure 101.

As will be appreciated by those skilled in the relevant art(s) after reading the description herein, an application service provider—an individual person, business, or other entity—may allow access, on a free registration, paid subscriber and/or pay-per-use basis, to infrastructure 101 via one or more World-Wide Web (WWW) sites on the Internet 124. Thus, the system 100 is scalable.

As will be appreciated by those skilled in the relevant art(s), in an aspect, various screens may be generated by the server 106 in response to input from the users 102 over the Internet 124. As a non-limiting example, the server 106 may be a typical web server running a server application at a website which sends out webpages in response to Hypertext Transfer Protocol (HTTP) or Hypertext Transfer Protocol Secured (HTTPS) requests from remote browsers on various computing devices 104 being used by various users 102. Thus, the server 106 is able to provide a graphical user interface (GUI) to the users 102 of the system 100 in the form of webpages. These webpages may be sent to the user's PC, laptop, mobile device, PDA or like device 104, and would result in the GUI being displayed.

As will be appreciated by those skilled in the relevant art(s) after reading the description herein, alternate aspects of the present disclosure may be provided as a stand-alone system (e.g., installed on one server PC) or as an enterprise system wherein all the components of infrastructure 100 are connected and communicate via inter-corporate Wide Area Network (WAN) or Local Area Network (LAN). As a non-limiting example where users 102 are all personnel/employees of the same company, the present disclosure may be implemented as a stand-alone system, rather than as a web service (i.e., Application Service Provider (ASP) model utilized by various unassociated/unaffiliated users) as shown in FIG. 1.

As will also be appreciated by those skilled in the relevant art(s) after reading the description herein, alternate aspects of the present disclosure may include providing the tools via a browser or operating system pre-installed with an application or a browser or operating system with a separately downloaded application on such devices 104. That is, as will be apparent to one skilled in the relevant art(s) after reading the description herein, the application that facilitates the content sharing platform herein, may be part of the "standard" browser or operating system that ships with the computing device 104 or may be later added to an existing browser or operating system as part of an "add-on," "plug-in," or "app store download."

The communication infrastructure 101 may be encrypted to provide for secure communications. A security layer may be included that is configurable using a non-hard-coded technique selectable by the sender which may be based on at least one of carrier, country encryption standards, etc. A type of encryption may include, but is not limited to, protection at least at one o communication protocol layer such as the physical hardware layer, communication layer (e.g. radio), data layer, software layer, etc. Encryption may include human interaction and confirmation with built-in and selectable security options, such as, but not limited to, encoding, encrypting, hashing, layering, obscuring, password protecting, and obfuscation of data transmission, frequency hopping and various combinations thereof. As a non-limiting example, to prevent spoofing and/or eavesdropping may be accomplished by adding two-prong security communication and confirmation using two or more data communication methods (e.g. light and radio) and protocols (e.g. pattern and freq. hopping). Thus, at least one area of security, as provided above, may be applied to at least provide for communication being encrypted while in the cloud, communication with shipper, communication with the recipient of the parcel, communication with the homing device 128 that may occur via the Internet, a Wi-Fi connection, Bluetooth, satellite, or another communication link, communications between the homing device 128 and the drone 126, communications between Internet of Things devices and a landing location 200 (as disclosed further herein with beginning with discussions pertaining to FIG. 2), and the like.

The Internet of Things, also known as IoT, is a network of physical objects or "things" embedded with electronics, software, sensors, and connectivity to enable objects to exchange data with the manufacturer, operator and/or other connected devices based on the infrastructure of International Telecommunication Union's Global Standards Initiative. The Internet of Things allows objects to be sensed and controlled remotely across existing network infrastructure, creating opportunities for more direct integration between the physical world and computer-based systems, and resulting in improved efficiency, accuracy and economic benefit. Each thing is uniquely identifiable through its embedded computing system but is able to interoperate within the existing Internet infrastructure. Communications may comprise use of transport layer security ("TLS"), fast simplex link ("FSL"), data distribution service ("DDS"), hardware boot security, device firewall, application security to harden from malicious attacks, self-healing/patching/firmware upgradability, and the like. Security may be further included by use of at least one of obfuscation of data transmission, hashing, cryptography, PKI, secured boot access, and the like.

Figure 2:
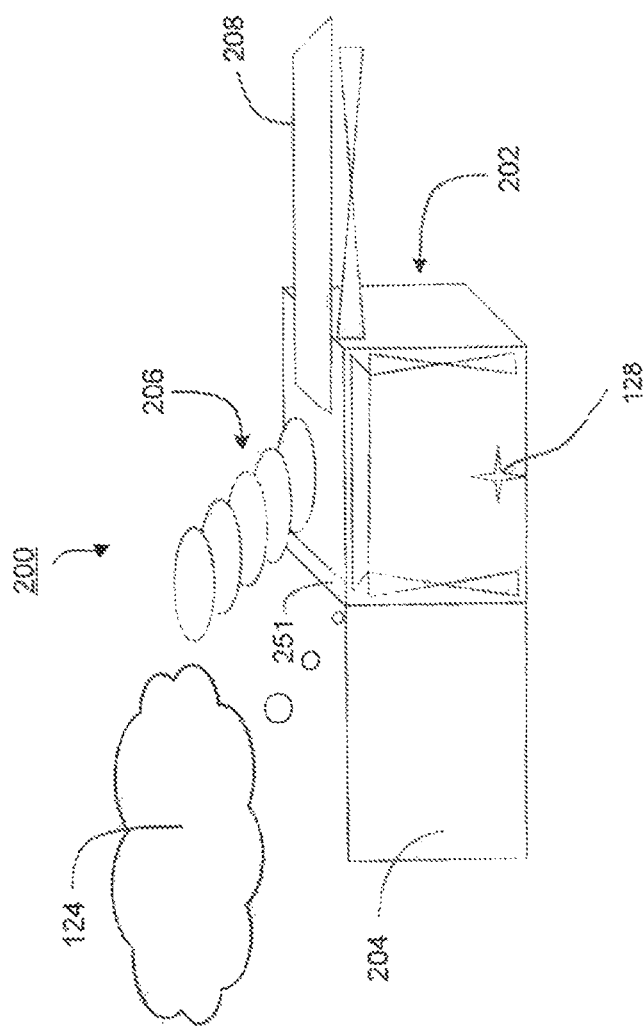
FIG. 2 is an image illustrating a container integrated with a homing device with various load options, according to an aspect of the present disclosure.
Figure 3:
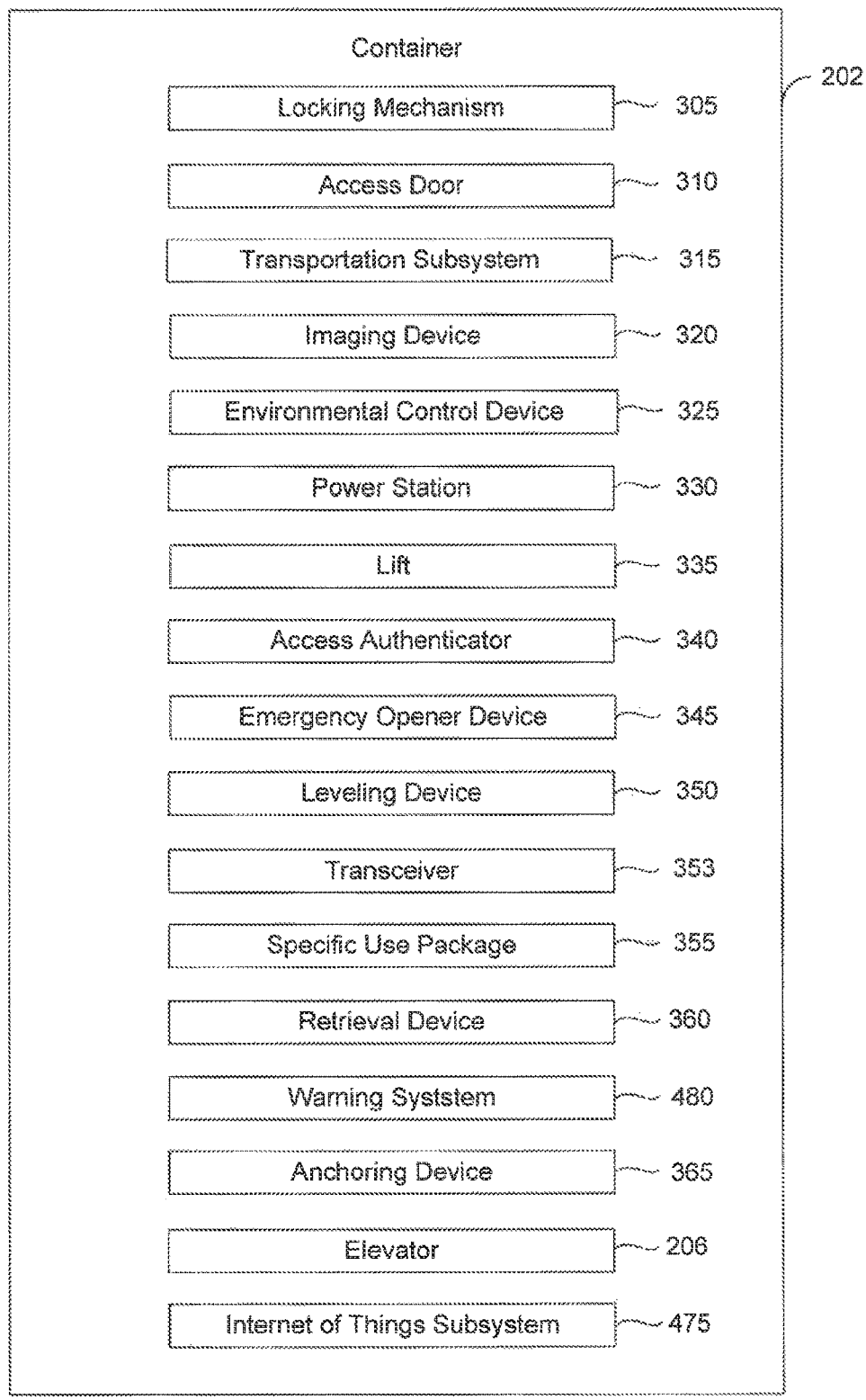
FIG. 3 is a block diagram of an embodiment of the container.

Referring now to FIG. 2, an image illustrating a graphical representation of a landing location. As a non-limiting example, the landing location 200 may be a secure parcel box 202, box, or container. Thus, the term secure parcel box should not be considered a limiting term. The secure parcel box may be any type of container or apparatus which may hold an object, including, but not limited to an extended net, etc. The secure parcel box 202 may be integrated with a homing device with various loading options. The homing device 128 may be a part of a secure parcel box 202. The secure parcel box 202 may be comprised of such elements as carbon fiber, steel, high-density polymer plastic/urethane, or any other such elements or combination of elements as being recognized by those skilled in the relevant art(s) as being rigid, durable, and resistant to wear, deformation, and tampering. The secure parcel box 202 may further comprise a locking mechanism 305 as shown in FIG. 3. Such a locking mechanism 305 may be engaged and disengaged either manually or automatically via a secure code in the form of a transponder, RFID signal, a barcode scan, any manually inputted code onto a keypad or touchscreen, mobile application or by any other means as recognized by those skilled in the relevant art after reading the description herein. The secure parcel box 202 may further comprise at least one lid, access door or door 204, 208, each with an automated functionality controlled by a robotic device. A top door or lid 208 is located on at a top of the container 202. The door may open via a hinge or may slide to a side, as illustrated, to provide for insertion of the parcel. In an embodiment, a similar door may be located at a bottom or base of the container 202 which may slide open or may be hinged. A side door 204 may be provided on one of the sides of the container 202 to allow entry into the container when the drone is not delivering a parcel aerially, as explained further below. The side door 204 may be slideable, as discussed above, or may be hinged.

The secure parcel box 202 may be configured such as to prevent unauthorized access to the contents therein. This may be accomplished by configuring the secure parcel box 202 to be fireproof, bulletproof, waterproof, and resistant to any other potentially damaging elements as recognized by those skilled in the relevant art(s), as well as by configuring the locking mechanism to prohibit computational hacking thereof.

In an embodiment, the secure parcel box 202 may comprise rigid bars of material in a cage-like structure so as to embody a more cost-efficient development alternative. The secure parcel box 202 may be configured to be immovable, such as to prevent theft. This may be accomplished, by way of a non-limiting example, by bolting the secure parcel box 202 to concrete. As explained further herein, the secure parcel box 202 may be able to be moved or travel to a preferred, desired or selected location. The secure parcel box 202 may be secured at the other location, such as, but not limited to the modular base 569 disclosed later herein.

As a non-limiting example with respect to securing the box, the secure parcel box 202 may have a locking mechanism that engages an object at the location, such as, but not limited to, the ground (or earth), an immovable object, etc. The locking mechanism may include, but is not limited to, an anchor which can bore into the ground, an extendable element that extends from the box and robotically fastens itself around or to the immovable object.

In an embodiment, the secure parcel box 202 may be placed in locations wherein drone flight is not feasible or allowed. To overcome limitations associated with placement, the secure parcel box 202 may be integrated with a conveyor belt or robotic device that may transport a parcel to or from another location. In another embodiment, instead of the robotic device or a conveyor belt, the drone 126 may be able to transport the parcel by moving on a ground surface or across a water surface transporting the parcel from where the drone 126 was allowed to land to where the parcel was to be delivered. Thus, the secure parcel box 202 may have a transportation subsystem 315 that comprises a controller, wheels or a sled device, to travel on the ground. Delivery by the drone 126 may then be accomplished via a side load option 204, which permits automated entry or removal of a parcel through the side door 204 of the secure parcel box 202.

In an embodiment where the drone may deliver or deposit the parcel aerially, the drone 126 may deliver and/or pick-up the parcel on a top portion of secure parcel box 202. An elevator mechanism 206 may raise or lower the parcel as needed to the top portion of secure parcel box 202. This embodiment may be useful for optimizing the configuration of the secure parcel box 202 on top of a building. In such a situation, the parcel can be lowered into the secure parcel box 202 and then further lowered into the building on which the box 202 is mounted. Similarly, the parcel may be raised from within a building into the secure box 202 and then further raised to the top portion of the box 202 such that it may be made available for access by the drone 126.

The secure parcel box 202 may be incorporated with one or more optical devices 320 (shown in FIG. 3) such that the optical device may record the delivery and pick-up of parcels into and out of the box 202, thereby adding an enhanced security element to the system. In another embodiment, the optical device 320 may be on the homing device 128. A non-limiting example of an optical device may be an imaging device, such as, but not limited to a camera.

The secure parcel box 202 may contain an environmental control device 325 (shown in FIG. 3), such as, but not limited to, heating and cooling devices in order to keep the content of a parcel at a certain desired temperature. As a non-limiting example, if the delivered parcel contains medicine, the container 202 may be notified of the contents, such as but not limited to, by the recipient/user of the box, shipper, or through communications between the drone 126 and the homing device 128, and regulate the temperature within the box to preserve the medicine. The environmental control device may also be configured to melt ice or snow that has formed or fallen onto the box and possibly hindering opening or closing the door.

Thus, the secure parcel box 202 may further comprise a power source 330 (shown in FIG. 3), such as, but not limited to, battery-pack, solar panel connectivity, AC or DC input, wind power connectivity, or any other means of receiving electric current as recognized by those skilled in the relevant art(s).

In an embodiment, the power source 330 may be a power station, wherein power source and power station may be used interchangeably herein, that functions to recharge/refuel/repower the drone 126, depending on what the drone 126 requires to operate. Such a power station may be integrated into the disclosed communication system wherein the drone 126 may be able to determine where the power stations are located and whether a given power station is occupied or vacant. Such power or charging stations may comprise a cradle, surface charger, or similar device as recognized by those skilled in the relevant art(s) as being capable of re-powering drone 126.

In another embodiment, the power station 330 may include robotic devices that may function to replace a component on the drone 126, such as, but not limited to, one or more batteries on the drone 126 or to make other repairs.

As a non-limiting example, when electrical power is used to recharge the drone 126, such electricity usage may be calculated and the owner of the drone 126 may be notified of and billed for such usage via communications within the system 100 as well as billing and payment methods currently known or later discovered by those skilled in the relevant art(s). The system 100 may comprise a means to notify the electricity provider, such as a home owner, business, power company, and the like, when such electricity has been used and when payment for such use has been completed. In a non-limiting example, the electricity use is not specifically paid for but rather is encompassed as part of a payment for use of the drone delivery system. Similar processes may be employed to pay for other aspects such as when battery replacement services are provided, wherein service and battery costs replace electricity usage costs.

In an embodiment, the secure parcel box 202 may be integrated with an automated door opener, such as, but not limited to, a scale, motion detector, sensor, or other similar device as recognized by those skilled in the relevant art(s). Such a device may cause the automated lid or a door on box 202 to be opened when the presence of the drone and/or parcel 126 is detected. However, access to the box 202 may only be granted to the drone 126 after it has been verified by the homing device 128 that the drone 126 has authorized access to the box 202.

Figure 4:
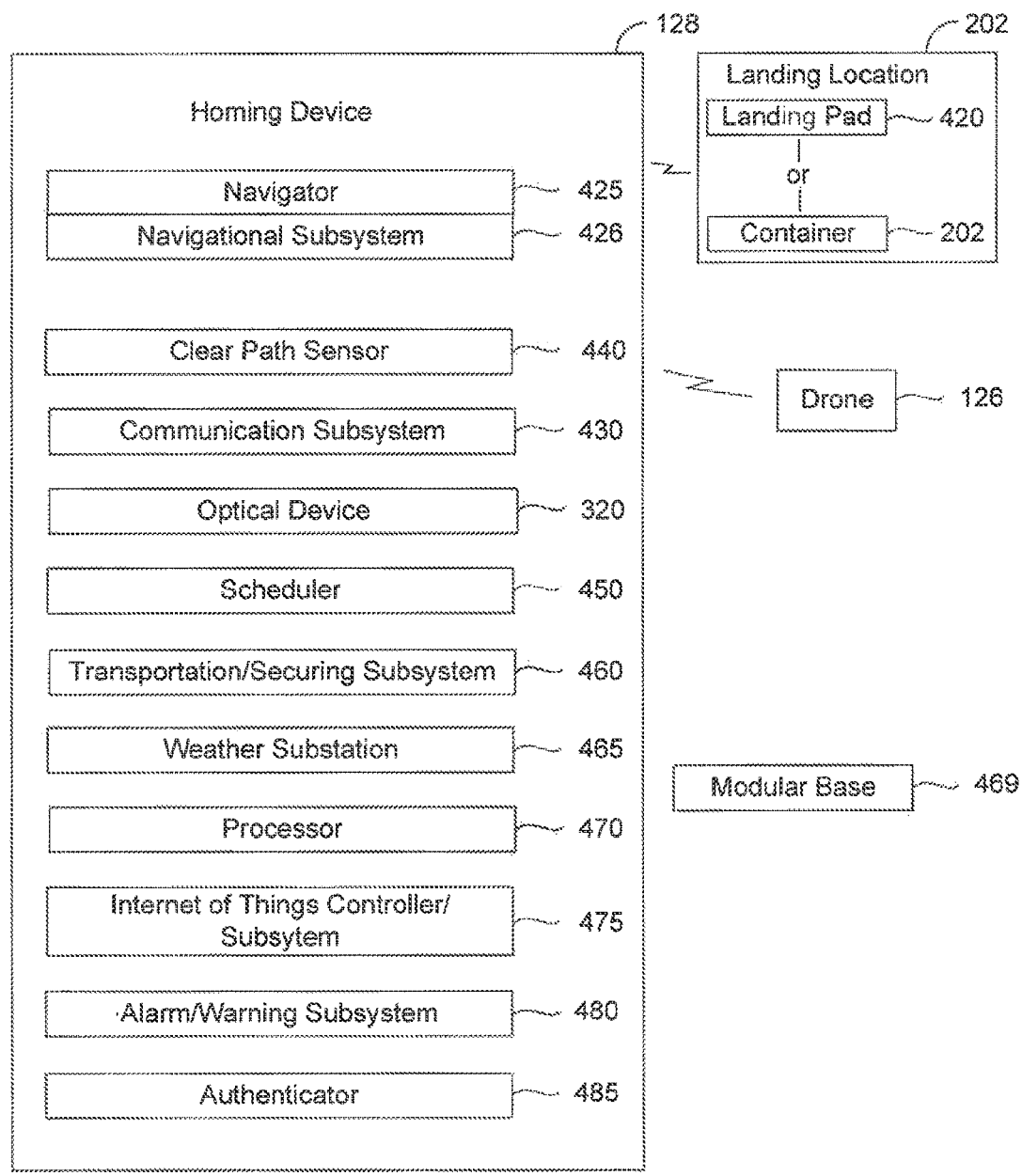
FIG. 4 is a block diagram of an embodiment of a system.

In another embodiment, the landing location 200 may be a flat surface acting as a landing pad 420 as illustrated in FIG. 4. The landing pad 420 may have a plurality of non-limiting configurations including, but not limited to be foldable, able to be rolled up, etc., wherein the landing pad 420 may be portable, or easily transportable by the user. The landing pad may also be used with the secure parcel box 202. Such a landing pad may be secured from unauthorized intruders via fencing, by being elevated on a balcony or other structure, or by any similar means as recognized by those skilled in the relevant art(s). The homing device may be used to direct landing of the drone 126 upon the landing pad.

FIG. 3 is a block diagram of the secure parcel box. As discussed above, the box 202 may have the door 310 through which the parcel may be placed or removed. The box 202 may include a lift configuration 335, or lift, to elevate the box, or box and homing device 128 when combined, to be out of reach of children or pets. Also, the box 202 may be elevated with the lift 335 when a delivery is about to be made. The lift 335 may have a scissor configuration or a telescoping pole configuration. If sensors detect that a pet or small child is within the immediate area, the container 202 may remain in an elevated configuration until no activity beneath it is further detected.

In an embodiment, the container 202 in a raised position may be the only vantage acceptable for the drone 126 where the drone's collision avoidance technology, or homing device 128, will not authorize further descent. Other raised platform options may include, but are not limited to, tethered, cable connected dirigible, a hoisted platform, box or parcel release mechanism to allow the package or parcel to be delivered at higher altitudes and reeled in via the cable or tether mechanism, etc.

In another embodiment, a leveling function, or device 350, may provide for better positioning and mounting of the box 202 so delivery will be on at least a near level surface. A base of the container 202 may have one or more points of contact which may be hand screwed or actuated electro mechanically to correct for a sloped location.

Though the container 202 is discussed above as having the leveling device 350 or the lift, a modular base 569 may be provided onto which the container 202 may be placed. A user may locate the modular base 569 at any desired location or may permanently affix it at a particular location. The modular base 569 may also comprise a transportation subsystem.

Access to the storage part of the secure parcel box 202 may be protected by an access authenticator 340. The access authenticator 340 may allow access to the user based at least an authentication technique using at least one of a fingerprint reader, encrypted code entered on a smart phone app, a box touchpad, voice recognition detector, retinal scan, a combination of any, etc. The access authenticator 340 may comprise a multi-method locking mechanism and secure technique to unlock as well as document how the box was unlocked. As a non-limiting example, a cell phone app may be used to unlock the box wherein the source (i.e., the phone number of app used) of the unlock signal is logged.

In another embodiment an emergency opener device 345 may be included. This may be included depending on a size of the parcel secure box 202, which may be provided in any plurality of sizes or shapes. As a non-limiting example, if a child or small animal mistakenly enters a storage or receiving area of the parcel secure box 202 and are locked in, a carbon dioxide sensor or detector, part of the emergency opener device, may be included to detect respiration and the command the parcel secure box 202 to open so that the child or animal may get out.

Furthermore, the access door 310 discussed above, may be pressure activated to open where it may be balanced so that weight of a pet, child, or foreign object cannot accidently unlock the door 310. Determining the amount of pressure may be determined by taking into account a weight of the drone 126 and a weight of the parcel being delivered. This information is communicated to the homing device 128, by means disclosed herein, wherein the homing device 128 relays to the container 202 an amount of pressure it should experience to open the door 310.

In another embodiment, the user may unlock the door when notified, by the box 202 and/or homing device 128, that a child or animal is within. Such a notice may be based on, but it not limited to, the carbon dioxide sensor, a pressure sensor inside the container 202 which activates plurality of times signifying that something is moving within the container, a camera imaging the inside of the container, etc. In another non-limiting example, the optical device of the homing device 128 or the container 202 captures a picture and the picture is sent to the user. The form of notification is non-limiting as notification may be via an electronic message (text or email), a call to the user's cell phone, an audible alarm, etc. The notice may also be sent to the proper authorities.

In another embodiment, during operation, unlocking the door 310 may only occur once a drone 126 is identified as being within a specific zone, weight of the drone is felt on the parcel secure box 202, proximity of the drone 126 to the parcel secure box 202 is close enough that delivery is imminent, etc. The term "imminent" is not used to be limiting as a timing of when the container 202 is unlocked may be accomplished in a plurality of ways, either in advance of or immediately upon time for a delivery to commence.

FIG. 4 shows a block diagram of an embodiment of the homing device with landing location. As shown, the homing device 128 is provided. As discussed above, the landing location 200 may be the secure parcel box 202 or the landing pad 420. The homing device 128 and the landing location 200 may be an integrated system or may two separate and distinct elements or components. More specifically, the homing device 128 does not need to be adjacent to or integrated with the landing location 200 to direct the drone 126 to the landing location 200.

Any one of a plurality of remote sensing technologies may be included. As a non-limiting example, a navigational sensor 425, navigator, etc., may be provided which may be a part of a navigational subsystem 426. The navigator 425 may comprise at least one navigational subsystem 426. In an embodiment, the navigator 425 may be configured to utilize a different navigational subsystem 426 depending on a distance the drone 126 is from the landing location 200. As a non-limiting example, a radio frequency based navigational subsystem or a Bluetooth LE subsystem may be in use, as the navigational subsystem 426, when the drone 126 is such a distance away that a clear line of sight between the drone 126 and homing device 128 does not exist. A light based navigational subsystem may then be used when the drone 126 and the homing device 128 are in a same light of sight. When the drone is within a few meters (feet), or closer of the landing location 200, an optical device 320 may then be used.

n an embodiment, the homing device 128 may communicate a parcel delivery or pick-up location without being physically present at such location.

As mentioned above, one form of the navigational subsystem 426 may be a lighting subsystem, which may be a remote sensing technology sensor that measures a distance by illuminating a target, such as with a laser and analyzing the reflected light, such as, but not limited to Light Detection and Ranging ("LIDAR"). Thus, a LIDAR sensor may be part of the drone 126. The LIDAR sensor may assist in directing the drone 126 to the intended landing location 200. The LIDAR sensor may also be used to determine whether the airway or air space that the drone 125 intends to take for landing, otherwise known as the landing path, is obstructed, such as, but not limited to, by an overgrown tree limb. In another embodiment, the lighting subsystem 426 may comprise visible and infrared lights that may be used to blink to transmit heading and confirm a heading and/or to communicate the navigational location and supporting data to the drone 126. In addition to what has been described above, the lighting subsystem may also comprise at least one of a light emitting diode, infrared light emitting diode, and strobe light navigational ranging systems.

Other non-limiting types of navigational subsystems may include, but is not limited to, ultrasonic range finder technology, LIDAR lite rangefinder technology, global positioning satellite ("GPS") technology, physical alignment methods/guides (e.g., physical guides, restrictors, shape to help drone land accurately (e.g., a bumper—stationary, movable, various heights; or a conical, pointed or unique matching shape to receive a complementary shape box/drone bottom), magnetic and/or electromagnetic devices and sensors air puffer at edge of box and or a vacuum port on the box to align the drone 126 to the center of the box 202 (wherein the drone 126 may experience one or more discrete series of puff(s) and a different series of puffs to confirm stop/land with the puffer being placed near a directional light), directional listening sensors to give heading whether audible by humans or not, a movable component at the location place wherein the drone may detect the motion of the movable component (which only begins to move when the drone is in proximity to land) as a way for the drone to "see" or detect the landing point, a proximity sensor, a transponder, a RADAR, radio frequency identification ("RFID"), etc. A particular navigational subsystem may be selected to best guide the drone to land when non-than ideal conditions, such as, but not limited to high wind, precipitation, insufficient remaining power, etc. are experienced during flight. In a similar fashion, a particular navigational subsystem may be used during acceptable or optimum flight conditions.

Other sensors on the homing device 128 may include, but are not limited to a Radio frequency emitter and other forms of communication emitters which may communicate proximity, bearing data, heading, vector, slope, GPS, lat. long. angle, range, altitude and other navigational guidance data to the drone transceiver(s). An optical device 320, such as, but not limited to an imaging device (such as, but not included to a camera), may also be included.

A clear path sensor 440 is included. The clear path sensor 440 may be a part of the communication subsystem 430. Thus, as discussed above, the homing device, 126, may ensure that a "clear sky" is available for the drone to operate. This determination may be made pre-flight and while in-flight. As a non-limiting embodiment, the clear path sensor 440 may comprise at least one of an optical device, lighting subsystem, such as but not limited to LIDAR, a proximity sensor, thermal sensor, laser detection subsystem, infrared detection subsystem, etc. The clear path sensor 440 may be used to scan and identify a safe path and to provide initial setup validation for the drone 126 to use. Additionally, ongoing communication may take place between the homing device 128 and the drone 126 during landing or take off should path conditions change, such as, but not limited to, a tree having fallen in the flight space, portable basketball goal moved into flight space, etc. a level of sensitivity may be able for the homing device 128 to notify the drone 126 of wires or other small objects, that may be in the landing or take off flight path where such sensitivity may be provided by at least one of LIDAR, radio frequency scanning, visual recognition (via an optical device), etc.

A communication subsystem 430 may be included. As those skilled in the art will readily recognize, the communication subsystem 430 may comprise communication techniques as the embodiments disclosed herein provide for various types of communication with various different entities where many may have a form of a transmitter and receiver or transceiver. Communication between the homing device 128 and the drone 126 may occur via wireless, WiFi, light, radio, RF, Bluetooth®, infrared, radar, electromagnetic spectrum, sonar, cellular, satellite, visual camera, or any other similar means as recognized by those skilled in the relevant art(s) after reading the description herein.

As such, the homing device 128 may have reception capabilities to receive communications from at least the drone's transmitters to provide for two-way communication and data exchange. This type of communications may be considered navigational communication and/or data exchange. The communication subsystem 430 homing device 128 may also be configured to communicate with the sender of the drone, shipper, or user, such as, but not limited to by way of direct cellular, cloud based communication, etc. As explained later herein, the communication subsystem 430 may be used to open and close an accessible manmade obstruction in its way, such as, but not limited to a gate or door, to assist in retrieving the parcel from the drone 126 with the box 202 and then storing the parcel at a secure location. In another embodiment, an Internet of Things controller 475 to open and close respective doors on such embodiments as gates and garage doors.

If the drone 126 loses satellite communication for navigation, the homing device 128 may provide communication to navigational data and instructional information via the homing device's Internet connectivity. As a non-limiting example, the drone may establish connection with the homing device 128 during the landing phase and subsequently encounter a GPS signal dead-zone where the drone 126 cannot receive sufficient data from GPS transmitters, the homing device 128 may provide UPS broadcast data via the Internet to help guide the drone 126 to a safe landing.

Furthermore, if the drone 126 has a necessity to provide or receive data or other communication to the shipper, drone owner, authorized personnel, etc., this communication may occur via the homing device's Internet connectivity. As a non-limiting example, the drone 126 may establish connection with the homing device 126 during the landing phase and subsequently transmits camera video feed via the homing device's Internet connection. This video feed may be via a virtual private network ("VPN") connection based upon the established homing device's connection to the Internet or may be stored in server storage for subsequent retrieval by authorized parties.

In another example, with the safety of the drone 126 and others in question, due to loss of connectivity with satellites and other beyond line of sight technology (BLOS) such as camera feeds, the homing device's Internet connectivity may be shared with the drone 126 to facilitate safe landing.

In an exemplary embodiment, a VPN server's configuration may be pre-defined based upon the drone 126, shipper and authorized personnel's hardware and software capabilities for connecting the homing device's network to the authorized destination server. In order to avoid being restrictive, the broadcast or rebroadcast of UPS data may be possible via the Internet or other connectivity such as radio frequencies and the like. One non-limiting example may include transmission of Differential UPS or real time kinematic ("RTK") GPS signals via a ground-based UPS transmitter.

The homing device 128 may also be further configured to be mobile. Thus, mobility may be established by having the homing device 128 attached to the box 202 when it has a mobile configuration as disclosed herein or by the homing device 128 being a part of a separate ground-based drone, identified as a transportation subsystem 460. As such, the box 202 may be able to move to a more appropriate location should a resent location to receive the drone 126 has been compromised, as explained herein. By being mobile, the homing device 128 may augment or improve the accuracy of delivery beyond what is possible by a fixed/mobile device (cellphone) with GPS capability and camera as the homing device 128 disclosed may move to a location where interference, such as, but not limited to, location interference from high rise building which may affect accurately pinpointing a GPS location is an issue.

A weather substation 465 may be a part of the homing device 128. The homing device 128 would also be able to ascertain current weather conditions at the intended landing location for the drone 126 and as the drone 126 approaches and communicates those conditions to the drone 126, or the shipper. If the box 202 cannot move to a location where it is unaffected by an adverse weather condition, so that it can continue in the air, the drone 126, shipper, and/or the homing device 128 will either abort the mission or determine another way for the drone 126 to complete its mission. As a non-limiting example, if inclement weather is detected instead of aborting the mission, and if the drone 126 is within a specific distance and unobstructed space is available, such as, but not limited to, a sidewalk, open field, etc., the drone 126 may be able to land and continue its mission on the ground. The container 202 could then be commanded by the homing device 128 to meet the drone alone the way to obtain the parcel.

The homing device 128 may also comprise a scheduler 450. When the airspace is in use by another drone, such as, but not limited to, a drone owned by another delivery company, the scheduler 450 may delay arrival or schedule arrival of the drone 126 to the landing location 200. The scheduler 450 may function to maintain a safe environment of no more than one drone near the landing location 200 at a time as a plurality of drones may be in an area to pick up parcels, deliver parcels, cool down batteries or recharge batteries, waiting for instructions or following instructions, etc. The scheduler 450 may also minimize conflicts by estimating an amount of time the drone 126 or other drones are going to be within the area of the landing location 200 to determine an available landing or departure time.

In operation, the shipper may notify the scheduler 450 of a pending order and expected time of arrival. The scheduler 450 may accept the order's arrival time or reject the order arrival time and offer a revised arrival time. Information about this communication may also be provided to the user of the homing device 128. The shipper may either accept the revised time or requests reconsideration. If a timing conflict occurs, the user may be contacted to resolve any dispute, such as, but not limited to, canceling an order, rescheduling an order, etc. If user does not make contact with the shipper within a certain time, the shipper may request the earliest time slot available beyond the rejected time even if on another day. in an embodiment, communications between the shipper and homing device 128 to select an acceptable shipping time may continue until a time is selected. Other delays to agreeing to a shipping time may include, but are not limited to environmental conditions, having an acceptable path for the drone 126 to reach the landing location, etc. The scheduler 450 may have an ability to rearrange pending orders, even orders being shipped from a second shipper to optimize receipt of the multiple parcels. The scheduler 450 may also delay delivery for other reasons, such as, but not limited to, as requested by the user. As discussed above, it is evident that the homing device 128 comprises at least one processor 470 as the scheduler may comprise a processor.

The processor 470 may also be used for data analysis performed artificial intelligence or data analytics. The artificial intelligence capability may comprise machine learning, analysis algorithms, deduction methods support of human interactions and automation and improvement of repetitive or required tasks. As a non-limiting example, the ability to determine a low supply of inventory and automatically place and receive an order based upon rules, sensors and data collection may be possible. Data analytics capability comprise any one of a technique such as, but not limited to, modeling, knowledge discovery, aggregation, statistical analysis, descriptive statistics, exploratory data analysis, predictive forecasting, classification and other techniques to provide actionable and predictive uses. The processor may exist remotely from the homing device and process data sent via the communications subsystem, with an ability to encrypt and secure the information as necessary.

Non-limiting examples of encryption, securing and/or encoding that may be utilized may be based on any one of a plurality of techniques, such as, but not limited to, programmable, formula-based methods, dynamic and statically specified protocols, dynamic device address changes, hashing algorithms, private/public key encryption and exchange, unique identifiers, pattern-matching, time-stamping, pre-arranged configuration settings of shipper-to-receiver communication; established standards such as Secure Communications Interoperability Protocol ("SCIP"), Secure Electronic Transaction Protocol, other application specific or platform layer independent protocols, etc. Other techniques may include, but are not limited to, wireless protocol standards (such as, but not limited to, WEP, WPA, WPA2), Bluetooth protocol standards (such as, but not limited to, AES-CCM cryptography, BR/EDR), where the low energy ("LE") controller may perform the encryption function, satellite security/encryption communication standards, cellular security/encryption communication standards, and any electromagnetic spectrum established standards for securing/encrypting data/content/messaging transmission and reception such as frequency-hopping, message/data obfuscation, or message timing and delivery-reception techniques, etc.

Multiple techniques of secure communications may be employed for redundancy, trust and confidence levels. Data mapping, static or dynamic order of data elements, configuration and selection of the specific methods/combinations of techniques may be configurable based upon the capabilities of hardware/software/firmware provided in the authorized shipper's platform as well as the homing device 128/container 202. These techniques may be implemented either in a flexible predefined or dynamically programmed approach.

As a non-limiting example, the use of Bluetooth LE to provide secure exchange between the drone 126 and the homing device 128 may establish a first level of confidence using UUIDs and secure data exchange, while a secondary exchange using light frequency spectrum pulsations may add a next, or additional, level of confidence to provide authentication to thereby allow the drone 126 to proceed to the landing location 200. Likewise, an exchange of Bluetooth LE and light communications may provide confidence for the box 202 to open to accept the delivery.

At the time of engagement of the drone 126 with the box 202, during and after delivery a series of secure messages may be sent to the shipper and recipient to notify each of information regarding at least one of the delivery, transaction status, and mission completion. All events, images, audio and data communication data. may be stored for later use, including as required for the use of law enforcement, safety and security purposes.

Thus, as explained above, the drone 126 may be remotely piloted, fully autonomous or any combination of control by the shipper or user, to the homing device. The homing device 128 may support all implementations via multi-faceted communication methods for guidance and navigational aids and data.

When the homing device 128 and container 202 box are integrated, or even when separate components, the unitary device or the individual components may be taken by the user when participating in a particular activity. In an embodiment, the container 202 may be able to have components, as part of a specific use package 355 as illustrated in FIG. 3, further added, temporarily, when taken with the user when participating in a particular activity. As a non-limiting example, there may be a fishing package where the homing device may have the inside storage area converted to a cooler and fishing pole holders may be attached to the outside of the homing device. A USB type receiver may be included which may be used, as a non-limiting example, to charge a cellular phone. At least two wheels may be attached to a base of the homing device container, plus a handle (such as, but not limited to an extendable handle), for a user to engage with to transport the homing device. A mini-drone may also be provided, and controlled by the homing device to fly a given distance from the homing device to locate a concentration of fish, either with a camera or a depth finder. At least one pocket may be included to hold tools needed while fishing, such as a knife, pliers, etc.

In another non-limiting example, the specific use package 355, or add-on package, may be for the user when on a boating excursion. The boating package may comprises many of the features disclosed above with respect to the fishing package and may further provide for the homing device being waterproof. This package may also comprise arm rest handles and at least one of an Emergency Position Indicating Radio Beacon or EPIRB, an automatic identification system (AIS), and a personal locator beacon. Cup holders may also be attachable.

In another non-limiting example, other packages 355 may include a beach/lake package, a game/sport package, a camper package, a tailgate package, a hunting package, a survivalist/prepper package, etc. Depending on the package or the user's preference other attachments that may be included are, but are not limited to, a receiver to fit ground stakes through to temporarily secure to a ground, a cover and/or rope boundary to keep individuals away from, an anchor system to secure the homing device at a desired location, an audio system with speakers to function another mobile device or as a standalone device, a. projectile device (such as, but not limited to, a baseball, Frisbee, or tennis ball, skeet, whiffle ball, etc.), a camouflage cover or coating to minimize visibility of the homing device, solar panels, etc. These features are not limited to be used with a particular package as they may be used for other intended uses of the homing device, such as, but not limited to, when used at a resident to receive a package.

The homing device 128 may also comprise an authentication system or an authenticator 484. The authenticator 485 may identify the recipient and the shipper to ensure delivery should occur at that location, thereby assuring the delivery is made from or to the proper person(s). The authenticator 485 may utilize any number of techniques to authenticate including, but not limited to, homing-device-ID, phone number, order number, drone-ill), timestamp, patterns, messages, images, shapes, passwords, passcodes, private and public keys, GPS location, radio signal ID, hardware ID, UUID, Mac Address, pre-defined identifiers, algorithm-based data exchange, etc.

The homing device 125 and/or secure parcel box may comprise at least one of a securing platform, which may be a part of the transportation system, also identified a transportation/securing subsystem 460, to move the homing device to a desired location. In a non-limiting example, the securing platform may be fixed at a defined location, such as, but not limited to being securely locked to a mounting platform which is fixed to the ground. In another non-limiting example, the homing device 128 is mobile where is has wheels or a blade/sled, so that it can either be moved by the user or autonomously moved to best direct the drone 126 in delivering the parcel. Once at a desired location, the homing device 128 or the box 202 may be anchored to the ground, with an anchoring device 365, as shown in FIG. 3.

Using such techniques is beneficial to ensure that the desired recipient received the package. As a non-limiting example, controlled medicines should only be delivered to the authorized person/patient per regulatory requirements. Utilizing embodiment disclosed herein, the shipper has the highest confidence of delivery and confirmation of receipt by the intended recipient as the delivery box will not open except by the authorized box owner or their established surrogate. Furthermore, with the optical device 320 on the homing device 128, an image of the receiver or recipient may be captured and sent to shipper once the delivery box is accessed.

The homing device 128 may be used to recover a secure parcel box 202 if taken or stolen. In an embodiment, the homing device 128 may have the optical device 320 arranged to record when an individual is within a field of view. The optical device 320 may then record the scene should the individual turn out to be to be a perpetrator who is stealing the box 202. The homing device 128 may then be able to track a location of the box 202 as other detection elements, or sensors previously disclosed, on the box 202 may be activated to assist in tracking the box 202. Communication may occur over any communication protocol included of the communication subsystem 430, such as, but not limited to, cell, satellite, Bluetooth, Wi-Fi, etc. The box 202 may be further configured to have the Internet of Things tracking capabilities. The box 202 may be configured to emit a loud audible alarm though speakers as discussed herein, with its warning system 480 when stolen, as activated by the homing device 128. Law enforcement can then track a location of the box 202 by either the audible alarm 480 or information obtained from the homing device 128. In addition to at least one speaker being a part of the box 202, a microphone may also be a part of it to provide for emitting the sound and to record the perpetrators who may admit to their criminal activities. In another embodiment, a low jack type technology may function to track the box with or without the homing device. In another embodiment, when the homing device 128 and the box 202 are separate, the homing device may track the box 202.

Figure 5:
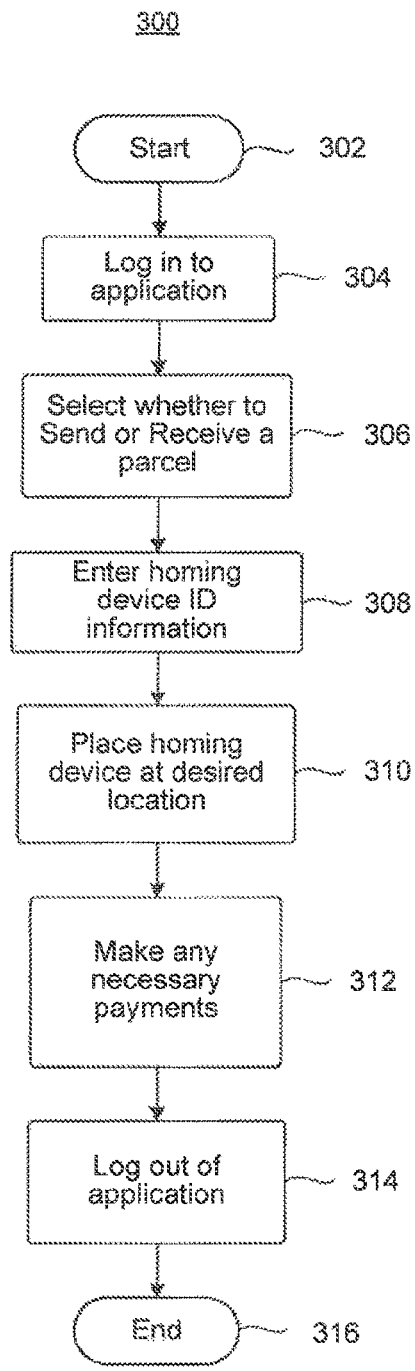
FIG. 5 is a flowchart illustrating an exemplary process for using a homing device to specify where a drone should deliver and/or pick-up a parcel, according to an aspect of the present disclosure.

Referring now to FIG. 5, a flowchart illustrating an exemplary process 300 for using a homing device to specify where a drone should deliver and/or pick-up a parcel is shown. The process 300, which may execute within the system 100 and facilitate the use of the homing device 128 to specify where the drone 126 should deliver and/or pick-up a parcel, begins at step 302 with control passing immediately to step 304. At step 304, the user 102 may log into system 100 by supplying the appropriate login credentials. The login credentials may take place via a. software application, a website, or a web application accessed by the user computing device 104. Alternatively, the login may take place via direct communication with the homing device 128, such as by entering the login credentials via a keypad, touchscreen, or other similar device connectively coupled to the homing device 128. Such login credentials may comprise a password, key code, pin number, visual identification, user II), or any similar means as recognized by those skilled in the relevant art as being able to securely determine the identity of a system user.

At step 306, the user may specify whether user desires to send or receive a parcel, or both. This allows the system 100 to communicate to the drone 126 which functions to engage in upon arrival. At step 308, the user 102 may enter identification information for the homing device 128 that the user 102 intends to use for the transaction. Such identification may be needed to enable communication between the homing device 128 and the drone 126. Step 308 may be omitted in a particular embodiment because the homing device and/or parcel box 202 may have been previously deployed by the user 102 or a third party.

At step 309, the user 102 may place the homing device 128 at a location where parcel delivery or pick-up is desired. The location may be a spot in the user's yard, atop a building, or inside the secure parcel box 202.

The homing device 128 may be configured to communicate the location of a parcel delivery or pick-up to the drone 126 with an accuracy of approximately three centimeters from entered GPS coordinates. The user may enter specific coordinates or select a location on an image display map representing the delivery and/or pick-up location. If the drone 126 is unable to access the first identified location, the homing device 128 may provide a prioritized order of alternative locations at which the parcel may be delivered or picked-up. In the case of an alternate pick-up location, a robotic device or conveyor belt may be integrated into the system 100 to allow for the movement of the parcel to the alternate pick-up site. In another embodiment, the drone 126 is able to continue to the location on surface of water. The alternate locations may be pre-selected by the user.

Once the drone 126 has picked-up or delivered a parcel at a specified location, the system 100 may transmit a communication providing confirmation of such to either the homing device 128 or the user 102 via, as a non-limiting example, the computing device 104. The communication may occur via email, text message, SMS message, Instant Message (IM), page, MMS message, or any other similar form of communication as recognized by those skilled in the relevant art(s). Such a message may comprise, by way of example and not limitation, the phrases, "Your package has arrived," and "Your package has been delivered." Other communications may be made between the user and the drone 126 via, the system 100 at various times while the drone 126 is in possession of a parcel. By way of example and not limitation, a message may be sent to a user-deliverer stating, "Parcel is currently in flight over Jacksonville, Fla." Similarly, a message may be sent to a user-receiver stating, "Your package will arrive in 7 hours." The communication may occur via wireless, radio, Bluetooth®, infrared, radar, electromagnetic, sonar, visual camera, or any other similar means as recognized by those skilled. in the relevant art(s) after reading the description herein.

At step 312, the user 102 may make any necessary payments associated with the delivery or pick-up of the parcel, including shipping costs, use of the system 100, and use of the drone 126. Such payments may be made by any means recognized by those skilled in the relevant art(s), including online credit card, debit card, or gift card payments. Communication of such payments as being due or received may be made to the user 102 in ways similar to communication means associated with step 309. The user 102 who sends a parcel may also receive payment(s) for the parcel at this stage of the process. Though making any necessary payments occurs at a particular place in this flowchart, this step, step 312 may occur at any time during this process.

At step 314, the user 102 may log out of the application. Alternatively, the user 102 may close the application without logging out. In various aspects, steps 312 and 314 are omitted. The process 300 terminates at step 316.

Figure 6:
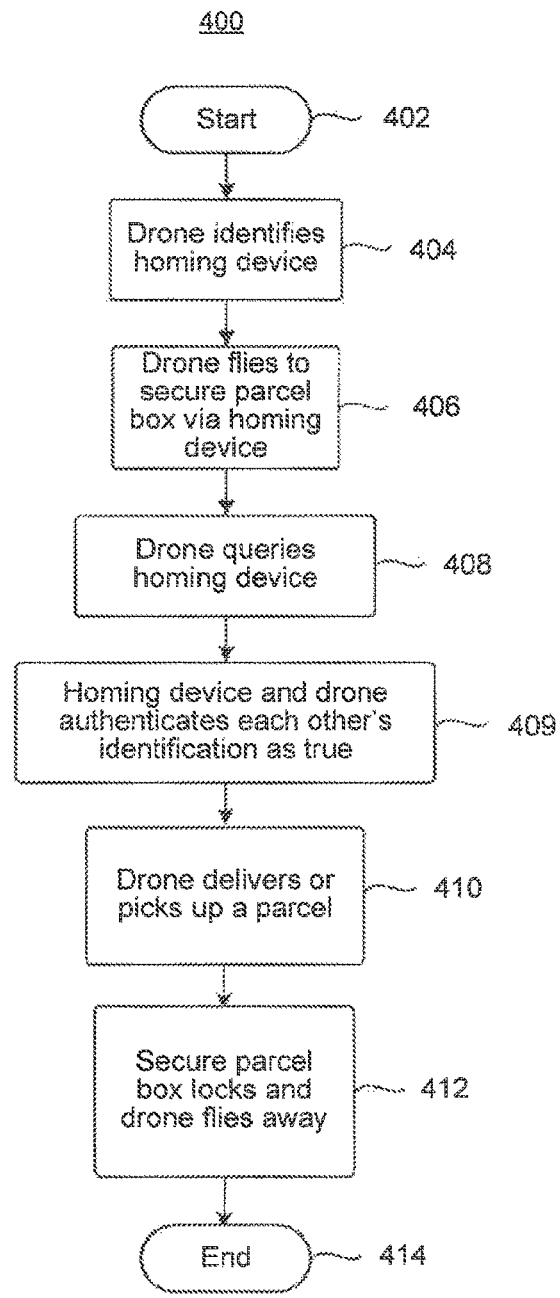
FIG. 6 is a flowchart illustrating an exemplary process for using a homing device to facilitate interaction between a drone and a container, according to an aspect of the present disclosure.

Referring now to FIG. 6, a flowchart illustrating an exemplary process 400 for using a homing device to facilitate interaction between the drone and the secure parcel box is shown. The process 400, which may execute within the system 100 and facilitate the use of the drone 126 interacting with the secure parcel box 202 via homing device 128, begins at step 402 with control passing immediately to step 404. At step 404, the drone 126 identifies the homing device 128 that is selected by the user 102 to communicate with the drone 126 for the purpose of sending or receiving a parcel.

Such communication may occur via wireless, radio, Bluetooth®, infrared, radar, electromagnetic, sonar, visual camera, or any other similar means as recognized by those skilled in the relevant art(s) after reading the description herein.

At step 406, the drone 126 flies to the location of the secure parcel box 202 via the homing device 128. The homing device 128 may be physically incorporated with the secure parcel box 202 or physically separate from it. At step 408, the drone 126 arrives at the secure parcel box 202 and queries the homing device 128 for access to the secure parcel box 202. This requires the drone 126 to provide verification to the homing device 128 that it is authorized to deliver and/or pick-up a parcel at the secure parcel box 202. Such verification may be made by providing an approved transponder signal, RFID signal, security code, or by any other similar means as recognized by those skilled in the relevant art(s) after reading the description herein. Upon receiving satisfactory validation credentials, the homing device 128 sends a message to the secure parcel box 202 to open an automated lid or door such that the drone 126 may access the inside of the parcel box 202 and deliver and/or pick-up the parcel.

In an embodiment, the drone 126 may not interact directly with the secure parcel box 202. Instead, once the homing device 128 has granted access to the secure parcel box 202, the drone 126 may deliver and/or pick-up a parcel to or from a robotic device or automated conveyor belt, either one of which may function to move parcels between the drone 126 and the secure parcel box 202.

At step 409, the homing device 128 and drone 126 authenticate each other's identification as true. Then at step 410, the drone delivers or picks up a parcel.

At step 412, the secure parcel box 202 receives an indication from the homing device 128 to close its automated lid or door and lock such. The drone 126 then flies away. The process 400 terminates at step 414. As disclosed further herein, other non-limiting approaches are available to close the box 202, or in such embodiments, the parcel may be left on top of the box 202 or on the landing pad 420.

Figure 7:
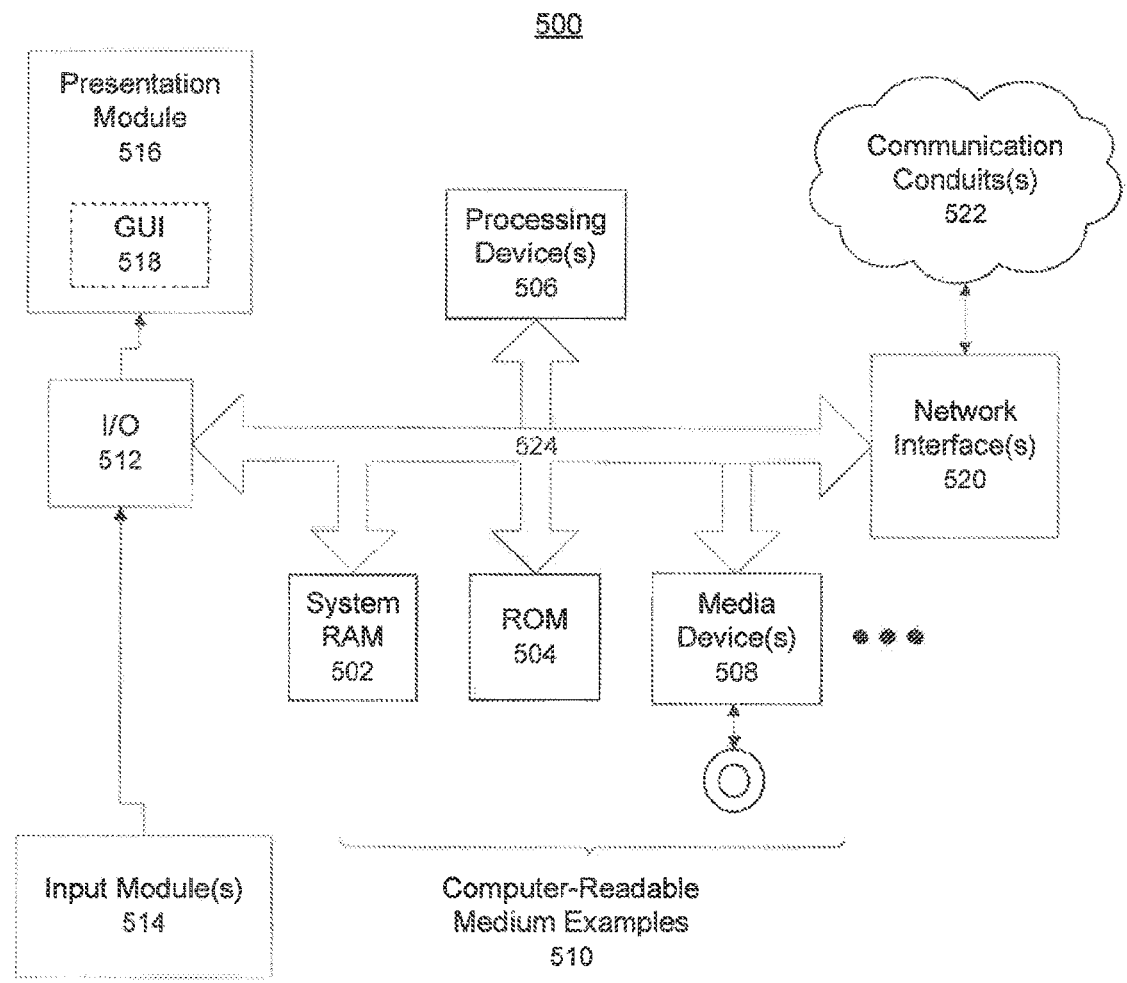
FIG. 7 is a block diagram of an exemplary computing system useful for implementing aspects of the present disclosure.
Figure 7:
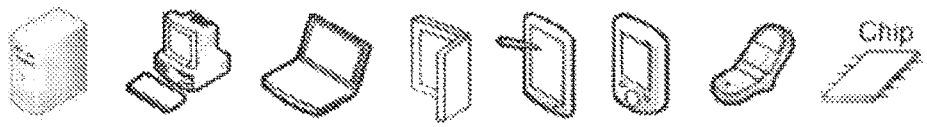

Referring now to FIG. 7, a block diagram of an exemplary computer system useful for implementing various aspects the processes disclosed herein, in accordance with one or more aspects of the present disclosure, is shown. That is, FIG. 7 sets forth illustrative computing functionality 500 that may be used to implement the web server 106, one or more gateways 112-122, user account database 110, computing devices 104 utilized by producer 102 to access Internet 124, or any other component of system 100. In all cases, computing functionality 500 represents one or more physical and tangible processing mechanisms.

The computing functionality 500 may comprise volatile and non-volatile memory, such as RAM 502 and ROM 504, as well as one or more processing devices 506 (e.g., one or more central processing units (CPUs), one or more graphical processing units (GPUs), and the like). Computing functionality 500 also optionally comprises various media devices 508, such as a hard disk module, an optical disk module, and so forth. Computing functionality 500 may perform various operations identified above when the processing device(s) 506 execute(s) instructions that are maintained by memory (e.g., RAM 502, ROM 504, and the like).

More generally, instructions and other information may be stored on any computer readable medium 510, including, but not limited to, static memory storage devices, magnetic storage devices, and optical storage devices. The term "computer readable medium" also encompasses plural storage devices. In all cases, computer readable medium 510 represents some form of physical and tangible entity. By way of example, and not limitation, computer readable medium 510 may comprise "computer storage media" and "communications media."

"Computer storage media" comprises volatile and non-volatile, removable and non-removable media implemented in any method or technology for storage of information, such as computer readable instructions, data structures, program modules, or other data. Computer storage media may be, for example, and not limitation, RAM 502, ROM 504, EEPROM, Flash memory, or other memory technology, CD-ROM, digital versatile disks (DVD), or other optical storage, magnetic cassettes, magnetic tape, magnetic disk storage, or other magnetic storage devices, or any other medium which can be used to store the desired information and which can be accessed by a computer.

"Communication media" typically comprise computer readable instructions, data structures, program modules, or other data in a modulated data signal, such as carrier wave or other transport mechanism. Communication media may also comprise any information delivery media, including cloud-based technologies. The term "modulated data signal" means a signal that has one or more of its characteristics set or changed in such a manner as to encode information in the signal. By way of example, and not limitation, communication media comprises wired media such as a wired network or direct-wired connection, fiber-optic, and wireless media such as acoustic, RF, infrared, and other wireless media. Combinations of any of the above are also included within the scope of computer readable medium.

The computing functionality 500 may also comprise an input/output module 512 for receiving various inputs (via input modules 514), and for providing various outputs (via one or more output modules). One particular output module mechanism may be a presentation module 516 and an associated GUI 518. Computing functionality 500 may also include one or more network interfaces 520 for exchanging data with other devices via one or more communication conduits 522, wherein communication conduits may also comprise cloud based technology. In some embodiments, one or more communication buses 524 communicatively couple the above-described components together.

The communication conduit(s) 522 may be implemented in any manner (e.g., by a local area network, a wide area network (e.g., the Internet), and the like, or any combination thereof). Communication conduit(s) 522 may include any combination of hardwired links, wireless links, routers, gateway functionality, name servers, and the like, governed by any protocol or combination of protocols.

Alternatively, or in addition, any of the functions described herein may be performed, at least in part, by one or more hardware logic components. For example, without illustrative types of hardware logic components that may be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

The terms "module" and "component" as used herein generally represent software, firmware, hardware, or combinations thereof. In the case of a software implementation, the module or component represents program code that performs specified tasks when executed on a processor. The program code may be stored in one or more computer readable memory devices. The features of the present disclosure described herein are platform-independent, meaning that the techniques can be implemented on a variety of commercial computing platforms having a variety of processors (e.g., set-top box, desktop, laptop, notebook, tablet computer, personal digital assistant (PDA), mobile telephone, smart telephone, gaming console, and the like).

Figure 8:
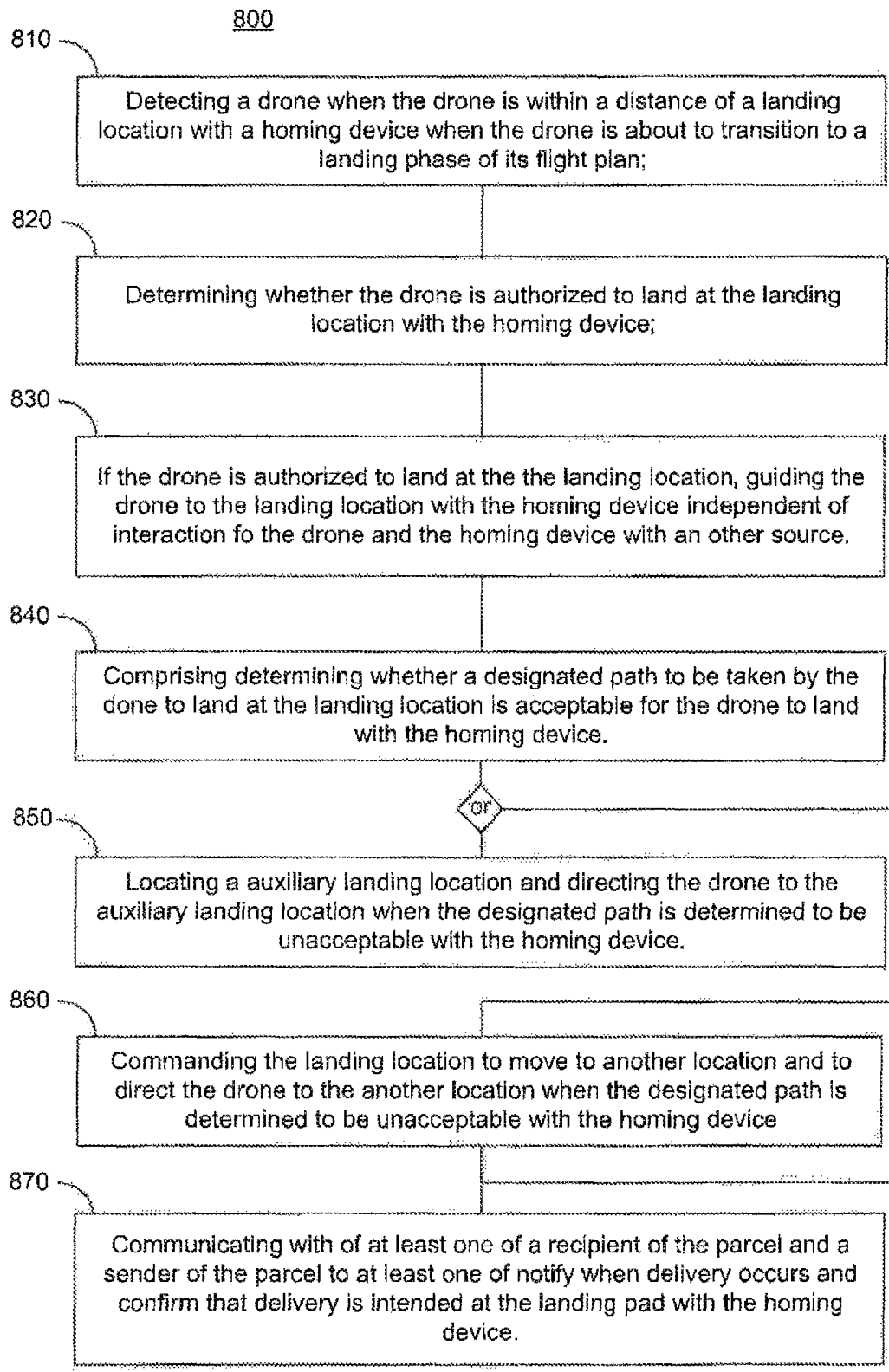
FIG. 8 is a block diagram of a flowchart illustrating an embodiment of a method.

FIG. 8 is a block diagram of a flowchart illustrating an embodiment of a method. The method 800 comprises detecting a drone when the drone is within a distance of a landing location with a homing device when the drone is about to transition to a landing phase of its flight plan, at 810. The method 800 further comprises determining whether the drone is authorized to land at the landing location with the homing device, at 820. if the drone is authorized to land at the landing location, the method 800 also comprises guiding the drone to the landing location with the homing device, independent of interaction of the drone and the homing device with another source, at 830.

The method 800 may also comprise determining whether a designated path to be taken by the drone to land at the landing location is acceptable for the drone to land with the homing device, at 840. Determining the designated path, at 840, may further comprise locating an auxiliary landing location and directing the drone to the auxiliary landing location when the designated path is determined to be unacceptable with the homing device, at 850. Determining the designated path, at 840, may further comprise commanding the landing location to move to an auxiliary location and to direct the drone to the auxiliary location when the designated path is determined to be unacceptable with the homing device, at 860. The method 800 may also comprise communicating with of at least one of a recipient of the parcel and a sender of the parcel to at least one of notify when delivery occurs and confirm that delivery is intended at the landing pad with the homing device, at 870. Though the steps are shown in a particular order, this order is not limiting. Furthermore, dependent steps 870 may be performed without the need of the other dependent steps.

In view of the above, a non-transitory processor readable storage medium is provided. The storage medium comprises an executable computer program product which further comprises a computer software code that, when executed on a processor, causes the processor to perform certain steps or processes. Such steps may include, but are not limited to, causing the processor to detect, with a homing device, a drone when the drone is within a distance of a landing location when the drone is about to transition to a landing phase of its flight plan, determine with the homing device communicating with at least one of the drone, a remote computing device of a user, and a provider of a parcel being transported by the drone whether the drone is authorized to land at the landing location, and if the drone is authorized to land at the landing location, guide the drone to the landing location with the homing device, independent of interaction of the drone and the homing device with another source.

In general, from an operational perspective, utilizing an embodiment disclosed herein, a user may order an available product. The user may designate a destination location, typically via GPS or street address and pays for the product. The user may also select a time frame for delivery. If the user has a homing device 128 platform/system 200 (or landing location which may be either a container 202 or a landing pad 420), the user may provide a designation or location of the homing beacon 128. The shipper would then establish a relationship with the homing device 128 or locate one that is in proximity of the destination location provided by the user so as to determine if the user has a homing device and box. The shipper could then communicate the shipping estimate time of arrival, package weight and size, temperature requirements and unique identification data to the homing device 128. The homing device 128 may arrange an agreed delivery time. This arranged delivery time may be further coordinated with the user. Since the user may typically receive parcels from various shippers, flexibility of communication with various shippers and their respective drones is possible. Then after the drone 126 begins its mission and upon reaching a given distance to the homing device 128, the drone will be guided by the homing device 128 to the landing location, independent of interaction with another source, such as, but not limited to, the shipper, a control depot, the user, etc.

As an Internet of Things non-limiting example, in operation, and as mentioned above, weather conditions may also be taken into consideration when utilizing the drone 126. Thus, in an embodiment, the drone 126 may near a backyard delivery area and a humidity sensor may indicate rain but an on-board camera on the drone identifies active sprinklers. Since drones may not able to fly in this condition, the homing device 128 may control the sprinkler system to shut off the sprinkler, or better yet, changes the sprinkler system's order or operating zones so the delivery may be made. The drone 126 then lands and deposits the parcel on or in the box 202. If the parcel is too large for the box opening, the box 202 may be movable, such as comprising wheels, a motor, and a controller wherein the box 202 may be a ground based drone. The box 202 could then motor off to the backyard garage to secure the parcel at a location where it will not be affected by the elements. If along the way the parcel slips off the box 202, the box 202 may be further configured to have an appendage, such as but not limited to an arm, cable, hook, grappling device, lever, etc. to capture, grasp, push, pull or otherwise seize the parcel so that it can continue to transport it to the secure location. Thus, the box may comprise a retrieval device 360 (as shown in FIG. 3). If access to the secure location, such as the garage is closed, then the box 202 may be configured to remotely engage an electromechanical door of the garage to open and move the parcel safely within. Once the parcel is secured, the box 202 may leave the secured location and actuates the door to the garage to close.

In another Internet of Things non-limiting operational example, when delivering to a residence and several undesired conditions are realized, the parcel may be delivered to a front yard of a desired location, at the landing location, as the moisture content of the backyard air was still too high for the drone 126 to enter. The drone 126 may communicate the change of location to the container 202, which may typically remain located in the back yard. The container 202 may then leave the backyard and travel to a gate, separating the back yard from the front yard, having a electromechanical lock. The box 202 may be configured to remotely unlock that gate. The box 202 may then secure the parcel from the drone 126 and then may return to the back yard with the parcel either on or within the box 202. The homing device 128 and box 202 (when integrated) may open the garage door and begin to bring the parcel within the garage when the infrared sensors housed in the homing device 128 identify an unusually high heat signature which has never before been recorded here. As a non-limiting example, a fire in the kitchen may be presumed. All household persons, or those with authorized access to the box 202 at a minimum, are notified by the homing device 128 and/or box 202, and the fire department is automatically called for help. In another non-limiting example, the box 202 emits an audible sound to warn of the danger. Thus, as further illustrated in FIG. 4, a warning system 480 may also be a part of the homing device 128.

Figure 9:
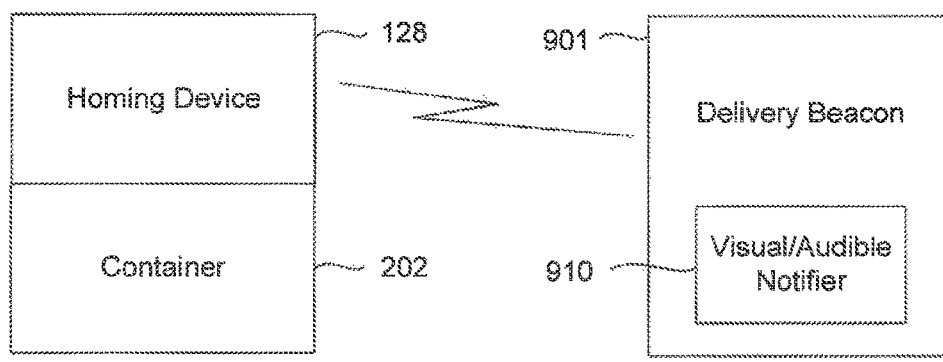
FIG. 9 is a block diagram of another embodiment of a system.

FIG. 9 shows a block diagram of another embodiment of the system. Considering the embodiments disclosed herein, for human delivery, the deliverer may have a delivery beacon 901 which communicates with the homing device 128 disclosed herein. The delivery beacon 901 may comprise a display or audible capabilities, such as, but not limited to a notifier 910, or notification device, to inform the deliverer Where to leave the package. The delivery beacon 901 would then have a code, or an authenticator, which would open the box 202 when the delivery beacon 901 is within a defined proximity to the box 202 or homing device 128. In another non-limiting embodiment, the delivery beacon 901 may be attached to the drone 126. In this configuration, the shipper may have a common purpose drone which may be configured, by attachment of the delivery beacon 901 to provide for a specific interaction with the homing device 128. The delivery beacon 901 may be a computer application, such as one which may be used with a. smart phone. As such, the notification device may be a smart phone. Once the delivery is complete, the container 202 is relocked.

While various aspects of the present disclosure have been described above, it should be understood that they have been presented by way of example and not limitation. It will be apparent to persons skilled in the relevant art(s) that various changes in form and detail can be made therein without departing from the spirit and scope of the present disclosure. Thus, the present disclosure should not be limited by any of the above described exemplary aspects.

In addition, it should be understood that the figures in the attachments, which highlight the structure, methodology, functionality and advantages of the present disclosure, are presented for example purposes only. The present disclosure is sufficiently flexible and configurable, such that it may be implemented in ways other than that shown in the accompanying figures (e.g., implementation within computing devices and environments other than those mentioned herein). As will be appreciated by those skilled in the relevant art(s) after reading the description herein, certain features from different aspects of the systems, methods and computer program products of the present disclosure may be combined to form yet new aspects of the present disclosure.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof. Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way. Therefore, the breadth and scope of the subject matter provided herein should not be limited by any of the above explicitly described embodiments. Rather, the scope of the embodiments should be defined in accordance with the following claims and their equivalents.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

What is claimed:

1. A system comprising:
   an unmanned vehicle configured to move autonomously in an environment;
   a homing device configured to generate a beacon wherein the beacon is capable of interacting with the unmanned vehicle and the unmanned vehicle is configured to generate a verification signal based on receipt of the beacon independent of whether the unmanned vehicle is in communication with another source and independent of whether the unmanned vehicle has sent a message to the homing device to establish a verified communication link, and wherein the homing device includes a first sensor configured to collect first sensor data;
   a data analytics platform in communication with the homing device;
   wherein the homing device is further configured to transmit the first sensor data to the data analytics platform, wherein the data analytics platform is configured to process first sensor data and transmit the processed first sensor data to the homing device; and wherein the processed first sensor data is transmitted to the unmanned vehicle using the verified communication link.

2. The system of claim 1 wherein the processed first sensor data is securely transmitted to a receiving server.

3. The system of claim 1 wherein the data analytics platform is integral to the homing device.

4. The system of claim 1 wherein the data analytics platform deploys trained artificial intelligence algorithms to process the first sensor data.

5. The system of claim 4 wherein the transmitted step is performed by the unmanned vehicle.

6. The system of claim 1 wherein the first sensor data comprises one of navigational data, weather substation data, internet of things data, alarm data, or clear path data.

7. The system of claim 1 wherein the system further comprises a secure communication system configured to transmit first sensor data or processed first sensor data from the homing device to a remote receiver.

8. The system of claim 1 wherein the system further comprises a secure communication system configured to transmit processed first sensor data from the unmanned vehicle to a remote receiver.

9. The system of claim 1 wherein the unmanned vehicle includes a second sensor configured to collect second sensor data and transmit the second sensor data to the homing device using the verified communication link and wherein the homing device is further configured to transmit the second sensor data to the data analytics platform and the data analytics platform is further configured to process the second sensor data.

10. The system of claim 9 wherein the second sensor is selected based on the first sensor data.

11. The system of claim 10 wherein the data analytics platform generates results data based on the first sensor data and the second sensor data and the results data is transmitted to a remote receiver.

12. A method comprising:
establishing a verified communication link between an unmanned vehicle and a homing device, wherein the homing device is configured to generate a beacon wherein the beacon is capable of interacting with the unmanned vehicle and the unmanned vehicle is configured to generate a verification signal based on receipt of the beacon independent of whether the unmanned vehicle is in communication with another source and independent of whether the unmanned vehicle has sent a message to the homing device;
receiving first sensor data from a first sensor;
processing the first sensor data; and
securely transmitting the processed first sensor data to a remote receiver.

13. The method of claim 12 wherein the first sensor is associated with the homing device and the remote receiver is the unmanned vehicle.

14. The method of claim 12 wherein the first sensor is associated with the unmanned vehicle and the processing step is performed by the homing device.

15. The method of claim 14 wherein the transmitting step is performed over the internet.

16. The method of claim 12 wherein the first sensor data comprises one of navigational data, weather substation data, internet of things data, alarm data, or clear path data.

* * * * *